(12) United States Patent
Kaplan et al.

(10) Patent No.: US 8,296,658 B2
(45) Date of Patent: Oct. 23, 2012

(54) GENERATOR FOR PERSONALIZATION OF ELECTRONIC DEVICES

(75) Inventors: Jonathan Kaplan, San Francisco, CA (US); Ariel Braunstein, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 394 days.

(21) Appl. No.: 12/284,345

(22) Filed: Sep. 19, 2008

(65) Prior Publication Data

US 2010/0077330 A1     Mar. 25, 2010

(51) Int. Cl.
*G06F 3/00*     (2006.01)
*G09G 5/02*     (2006.01)

(52) U.S. Cl. .................. 715/732; 715/731; 345/594

(58) Field of Classification Search .......... 345/441–443, 345/581, 589–595; 705/26–27; 715/730–732, 715/762–763, 866

See application file for complete search history.

(56) References Cited

U.S. PATENT DOCUMENTS

| | | | |
|---|---|---|---|
| 5,016,183 A | 5/1991 | Shyong | |
| 5,291,395 A | 3/1994 | Abecassis | |
| 5,799,008 A | 8/1998 | Kano et al. | |
| 5,870,771 A | 2/1999 | Oberg | |
| 5,903,274 A | 5/1999 | Gibson et al. | |
| 5,966,131 A | 10/1999 | Marks | |
| 5,966,454 A | 10/1999 | Thomas et al. | |
| 6,005,969 A | 12/1999 | Thomas et al. | |
| 6,069,778 A | 5/2000 | Kano et al. | |
| 6,117,061 A | 9/2000 | Popat et al. | |
| 6,147,688 A | 11/2000 | Clair | |
| 6,507,353 B1 | 1/2003 | Huard et al. | |
| 6,535,770 B1 | 3/2003 | Van Laethem | |
| 6,563,960 B1 | 5/2003 | Chan et al. | |
| 6,570,581 B1* | 5/2003 | Smith | 345/632 |
| 6,925,196 B2* | 8/2005 | Kass et al. | 382/111 |
| 7,408,673 B1* | 8/2008 | Chinn et al. | 358/1.9 |
| 7,614,011 B2 | 11/2009 | Karidis et al. | |

(Continued)

FOREIGN PATENT DOCUMENTS

KR     2001057437     7/2001

(Continued)

OTHER PUBLICATIONS

Paint Shop Pro 7.01. Jasc Software, Inc. Feb. 2001, screenshots from working program, pp. 1-15.*

(Continued)

*Primary Examiner* — Chat Do
*Assistant Examiner* — Ryan Barrett
(74) *Attorney, Agent, or Firm* — Patterson & Sheridan, LLP

(57) ABSTRACT

A graphical user interface includes a primary color palette including a first plurality of colors and a secondary color palette including a second plurality of colors. A first color is defined as a primary color and a second color is defined as a secondary color. The secondary color is different from the primary color. The graphical user interface also includes a plurality of styles, with a style defined as an initial style. The graphical user interface further includes an intensity scale ranging from a minimum intensity value to a maximum intensity value. An indicator is positioned in association with an initial intensity value. Moreover, the graphical user interface includes a display tile including an initial pattern that is displayed based on the primary color, the secondary color, and the initial style and a subsequent pattern that is modified from the initial pattern based on the initial intensity value.

21 Claims, 11 Drawing Sheets

U.S. PATENT DOCUMENTS

| | | | |
|---|---|---|---|
| 7,852,514 B1* | 12/2010 | Chinn et al. | 358/2.1 |
| 7,884,953 B1* | 2/2011 | Willcocks et al. | 358/1.15 |
| 7,895,091 B2* | 2/2011 | Hegemier et al. | 705/28 |
| 2003/0078859 A1* | 4/2003 | Coke et al. | 705/27 |
| 2004/0012590 A1* | 1/2004 | Kurzweil | 345/441 |
| 2004/0095396 A1 | 5/2004 | Stavely et al. | |
| 2005/0039129 A1 | 2/2005 | Paul | |
| 2005/0039130 A1 | 2/2005 | Paul | |
| 2005/0039131 A1 | 2/2005 | Paul | |
| 2005/0047589 A1* | 3/2005 | Chang | 379/452 |
| 2005/0081154 A1 | 4/2005 | Vogel | |
| 2005/0161558 A1 | 7/2005 | Stahl et al. | |
| 2005/0232351 A1 | 10/2005 | Jung | |
| 2005/0257137 A1* | 11/2005 | Weber et al. | 715/512 |
| 2005/0280660 A1 | 12/2005 | Seo et al. | |
| 2006/0001677 A1* | 1/2006 | Webb et al. | 345/594 |
| 2006/0031240 A1 | 2/2006 | Eyal et al. | |
| 2006/0044324 A1* | 3/2006 | Shum et al. | 345/595 |
| 2006/0156240 A1* | 7/2006 | Lemay et al. | 715/730 |
| 2007/0013711 A1* | 1/2007 | Asente et al. | 345/581 |
| 2007/0113183 A1* | 5/2007 | Brinkmann et al. | 715/723 |
| 2007/0146464 A1 | 6/2007 | Shino | |
| 2007/0220412 A1* | 9/2007 | Muhlhauser et al. | 715/500.1 |
| 2007/0229526 A1* | 10/2007 | Hsu | 345/581 |
| 2008/0007564 A1* | 1/2008 | Tokunaga | 345/594 |
| 2008/0148184 A1 | 6/2008 | Davis | |
| 2008/0172326 A1* | 7/2008 | Winters | 705/38 |
| 2008/0313552 A1* | 12/2008 | Buehler et al. | 715/760 |
| 2009/0063982 A1 | 3/2009 | Cho et al. | |
| 2009/0184966 A1* | 7/2009 | Perani et al. | 345/442 |
| 2009/0262130 A1* | 10/2009 | Ramirez | 345/595 |
| 2009/0265632 A1* | 10/2009 | Russ et al. | 715/716 |

FOREIGN PATENT DOCUMENTS

WO    2005075905    8/2005

OTHER PUBLICATIONS

CN 200939740 by Wang Hong Ding, Published on Mar. 29, 2006.
"Microsoft Unveils Device Customization via New Zune Originals Store, New Zune Players Available Tomorrow", Published by Microsoft on Nov. 12, 2007 at http://www.microsoft.com/press/pass/press/2007/nov07/11-12ZuneCustomizationPR.mspx.
"Red Zune 80GB and New Collection of Artwork Debut on Zune Original", published by Microsoft Corp., on Jan. 21, 2008.
Office Action in U.S. Appl. No. 12/284,262 dated Sep. 30, 2010.
Office Action, U.S. Appl. No. 12/284,346 dated Jan. 4, 2011.
Office Action in U.S. Appl. No. 12/284,262, mailed Jul. 21, 2011.
"Graphic Design", http://www.machinedesign.com, published Jun. 18, 1998.
Office Action in U.S. Appl. No. 12/284,262, mailed Feb. 7, 2011.

* cited by examiner

GENERATOR FOR PERSONALIZATION OF ELECTRONIC DEVICES

CROSS-REFERENCES TO RELATED APPLICATIONS

The following three regular U.S. patent applications (including this one) are being filed concurrently and the entire disclosures of the other applications are hereby incorporated by reference into this application for all purposes:

U.S. patent application Ser. No. 12/284,262, filed Sep. 19, 2008, entitled "Method and System for Personalizing Portable Electronic Devices";

U.S. patent application Ser. No. 12/284,345, filed Sep. 19, 2008, entitled "Design Generator for Personalization of Electronic Devices"; and U.S. patent application Ser. No. 12/284,346, filed Sep. 19, 2008, entitled "Method of Operating a Design Generator for Personalization of Electronic Devices".

BACKGROUND OF THE INVENTION

The present invention relates generally to methods and systems for generating unique designs for use in personalization of electronic devices. Merely by way of example, embodiments of the present invention provide a system for generating a multi-color, spatially varying design that is permanently printed onto a surface of an electronic device. In a particular embodiment, the design is based on randomization of a user's inputs and is printed onto an exterior surface of a digital camcorder. However, the scope of embodiments of the present invention is broader than this particular application and can be applied to other electronic devices including cameras, phones, personal digital assistants, and the like.

Digital video cameras and other personal electronic devices are currently in widespread use. The outer surfaces of these electronic devices is generally not personalized. Thus, a conventional camera, phone, or video camera will include an exterior surface of a single color, perhaps including a logo associate with the device manufacturer or service provider. In order to "personalize" electronic devices, manufacturers have marketed "shells" or "skins" that can be snapped over the original device or can replace one or more exterior surfaces of the original device. An example of such a skin is a removable faceplate for a cellular phone, which, for example, may include a logo of a favorite sports team.

Some computer manufacturers have provided customers with an option of specifying an exterior color or pattern for laptop computers. Additionally, when purchasing a laptop computer, some manufacturers provide the purchaser with the option of choosing from a set of predefined images that are displayed on one or more exterior surfaces of the laptop computer.

Despite the availability of replaceable shells and some products with predefined images, there is a need in the art for methods and systems to personalize electronic devices.

SUMMARY OF THE INVENTION

According to the present invention, methods and systems for generating unique designs for use in personalization of electronic devices are provided. Merely by way of example, embodiments of the present invention provide a system for generating a multi-color, spatially varying design that is permanently printed onto a surface of an electronic device. In a particular embodiment, the design is based on randomization of a user's inputs and is printed onto an exterior surface of a digital camcorder. However, the scope of embodiments of the present invention is broader than this particular application and can be applied to other electronic devices including cameras, phones, personal digital assistants, and the like.

According to an embodiment of the present invention, a method of generating a customized image is provided. The method includes forming a first design including a first pattern having a first color and a second color and receiving input from a user using a design modification element. The method also includes forming a second design including a second pattern including a third color and a fourth color. A change from the first design to the second design is proportional to the input received from the user using the design modification element.

According to another embodiment of the present invention, a method of generating a customized image for personalization of an electronic device is provided. The method includes providing a primary color and providing a secondary color. The method also includes determining an initial pattern defined by pattern properties including a first color that is a derivative of the primary color, a second color that is a derivative of the secondary color, and a linear dimension. The method further includes forming an animated display tile including the initial pattern at a first time and a series of subsequent patterns including the customized image. The series of subsequent patterns are formed based on a predetermined intensity value. Moreover, the method includes receiving a user input at a second time and pausing the animated display tile at the customized image of the series of subsequent patterns in response to the user input at the second time.

According to yet another embodiment of the present invention, a graphical user interface is provided. The graphical user interface includes a primary color palette including a first plurality of colors. A first color is defined as a primary color. The graphical user interface also includes a secondary color palette including a second plurality of colors. A second color is defined as a secondary color and the secondary color is different from the primary color. The graphical user interface further includes a plurality of styles. A style of the plurality of styles is defined as an initial style. Moreover, the graphical user interface includes an intensity scale ranging from a minimum intensity value to a maximum intensity value. An indicator is positioned in association with an initial intensity value. Additionally, the graphical user interface includes a display tile including an initial pattern that is displayed based on the primary color, the secondary color, and the initial style and a subsequent pattern that is modified from the initial pattern based on the initial intensity value.

According to a particular embodiment of the present invention, a system configured to generate a customized image for personalization of an electronic device is provided. The system includes a design modification element and a display tile including a first image characterized by a first color, a second color, and a spatial pattern based on the design modification element. The system also includes a user input module configured to receive a user input related to the design modification element. The display tile is updated to include a second image characterized by a third color based on at least one of the design modification element or the user input.

According to another particular embodiment of the present invention, a computer readable medium includes code for forming a first design including a first pattern having a first color and a second color and code for receiving input from a user using a design modification element. The computer readable medium also includes code for forming a second design including a second pattern including a third color and a fourth color. A change from the first design to the second design is proportional to the input received from the user using the design modification element.

Numerous benefits are achieved using the present invention over conventional techniques. For example, an embodiment according to the present invention provides a system for generating personalized images that is easy to use, yet provide colorful and interesting designs. Additionally, embodiments allow a user to create unique designs without needing complicated design programs. Moreover, embodiments of the present invention provide a user with an experience in which the user feels more creative than he/she may otherwise be. Furthermore, utilizing embodiments of the present invention, a user typically appears more creative to others than they may otherwise be able to appear. As described throughout the present specification, embodiments of the present invention can control and change multiple variables simultaneously, while all a user has to do is use a simple slider and select images that they like. This allows for a visual exploration of designs without having to know what is happening "under the hood." For example, the user may not know all the variables that are changing between a series of images (e.g., image A and image B), but they are able to see the results of those changes and determine if such changes are pleasing.

According to some embodiments, a user can select from multiple styles, such as lines or dots or geometric patterns. When animated, each of these styles may be handled by the computer in completely different ways. For example, some of the random changes made to dots will not be made to lines (such as changing the shape of the dots from round to oval or irregular, or changing the transparency of dots as they overlap. These processes performed by the systems described herein, will be transparent to the user, who will just have to use a single slider to control the intensity of the changes that happen to their selected style. Thus, to the user, embodiments of the present invention present no change in the complexity of the system between styles, although there may be substantial changes in how the alternate styles are handled and animated by the system. Depending upon the embodiment, one or more of these benefits may exist. These and other benefits have been described throughout the present specification and more particularly below.

DETAILED DESCRIPTION OF SPECIFIC EMBODIMENTS

According to the present invention, methods and systems for generating unique designs for use in personalization of electronic devices are provided. Merely by way of example, embodiments of the present invention provide a system for generating a multi-color, spatially varying design that is permanently printed onto a surface of an electronic device. In a particular embodiment, the design is based on randomization of a user's inputs and is printed onto an exterior surface of a digital camcorder. However, the scope of embodiments of the present invention is broader than this particular application and can be applied to other electronic devices including cameras, phones, personal digital assistants, and the like.

Embodiments of the present invention provide methods and systems for users to create personalized designs that enable the user to demonstrate their self-expression through these personalized designs. As described throughout the present specification, the personalized designs provided herein are based not only on user inputs, but randomized variations on the user inputs, thereby providing the user with a vehicle to create unique, personalized designs. In other embodiments, rather than utilizing randomized variations, a non-random algorithm is utilized in the creation of the personalized designs. Thus, although several embodiments are described in the context of randomized variations, this is not require by embodiments of the present invention.

Figure 1:
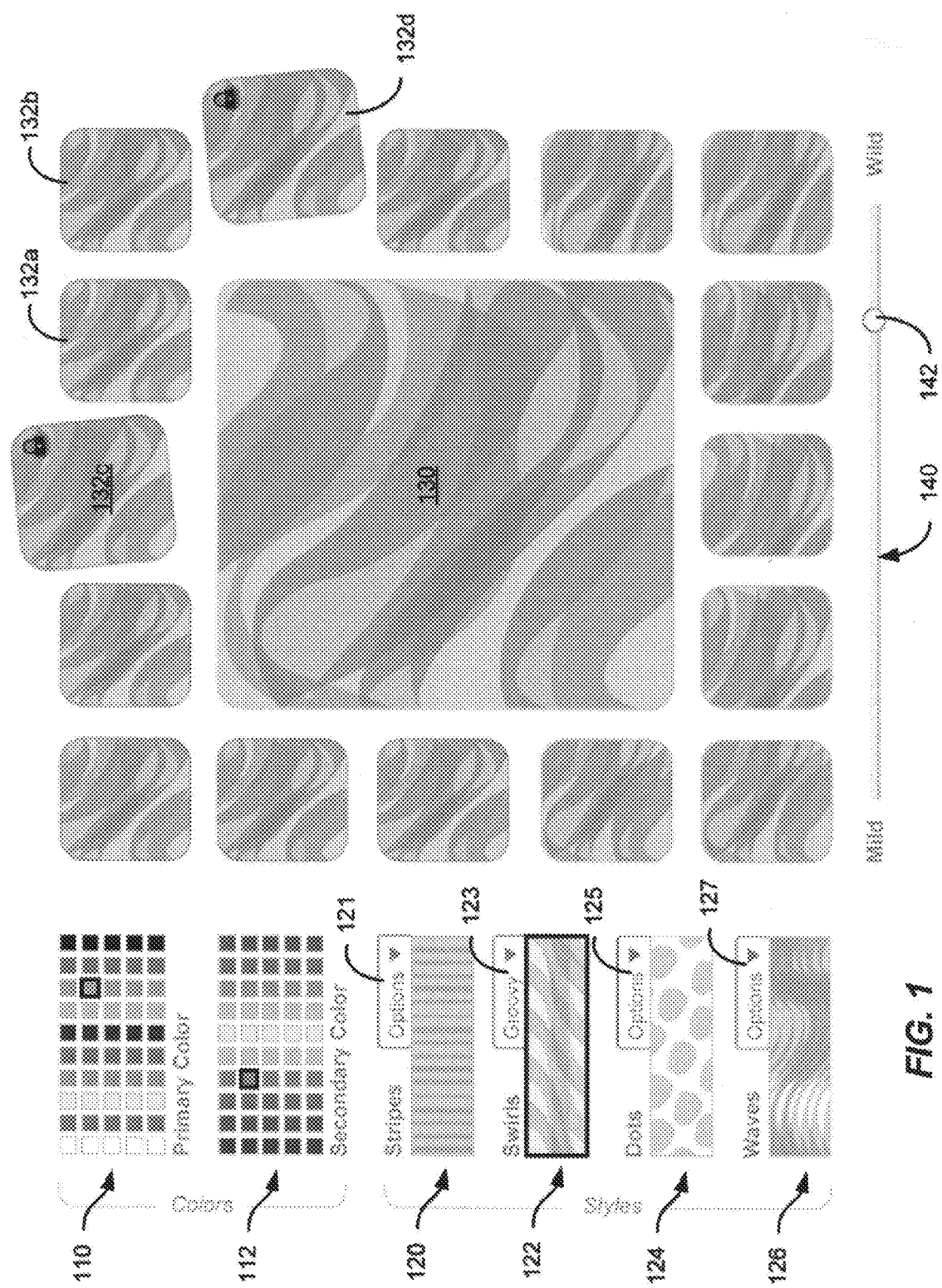
FIG. 1 is a simplified illustration of a design generator according to an embodiment of the present invention.

As described in the concurrently filed application Ser. No. 12/284,262, a user is presented with various personalization options, including uploading their own content (e.g., a photograph), selecting from one of many designs maintained in a design library, or using a design generator to create their unique design. FIG. 1 is a simplified illustration of a design generator according to an embodiment of the present invention. As described more fully throughout the present specification, the design generator enables a user to explore a number of different designs.

The design generator includes a set of color palettes including a first color palette 110 and a secondary color palette 112. Although two color palettes are utilized in the embodiment illustrated in FIG. 1, a single color palette or more than two color palettes can be utilized in alternative embodiments. Each of the color palettes includes a plurality of colors, including various shades of particular colors. In an embodiment, the design generator will automatically have a default color selected for the primary color palette and the secondary color palette. In another embodiment, when the design generator is first loaded, a random set of parameters will be used for the colors and/or patterns so that the animation, as described throughout the present specification, will be able to run quickly after the application is opened and/or launched. In yet other embodiments, neither a default selection or random set of parameters will be utilized and the user can select the parameters used during the design generation process. One of ordinary skill in the art would recognize many variations, modifications, and alternatives.

The styles illustrated in FIG. 1 include a number of different patterns including stripes 120, swirls 122, dots 124, waves 126, and other patterns that are not shown for purposes of clarity, including geometrical shapes and the like. As described more fully below, the various styles have a number of options provided, in the embodiment illustrated in FIG. 1, in pull-down menus 121, 123, 125, and 127. In an embodiment, a default style will be selected and indicated as illustrated by the primary and secondary colors as shades of orange and swirls in FIG. 1. If the user initiates the design generator (typically by clicking on a play arrow displayed in the middle of the display tile 130), then the default style or a particular style chosen by the user will appear in the display tile 130. The use of the default style and colors is not required by embodiments of the present invention, but is utilized merely by way of example to illustrate a particular method of operation of the systems described herein.

Embodiments of the present invention provide for the user to direct a moving/flowing process of design including random elements. As you modify the primary and secondary colors from the color palettes, the colors displayed in the display tile will continue to change and evolve into many different designs, that in effect, will cycle through the display tile. As described more fully below, if a user selects a particular design, by, for example, hovering over the display tile or one of the alternative tiles, the design will pause in mid-formation. The selected design can then be used as a new starting point or selected for use in personalization of the electronic device.

After initial selection of the colors and style (or selection by default) and initiation by the user, the design will begin animating in the display tile. In another embodiment, rather than starting after user initiation, the animation may begin spontaneously or based on another factor, such as a time period or the like. As an example, one of the styles (e.g., stripes, swirls, circles, dots, geometrical shapes, or the like), for example, stripes, is selected and the display tile will have a number of lines, that may have varying width and color. As the tile animates, the widths of the various lines in the pattern as well as the colors will constantly change. The intensity of the changes in the shape and colors will depend on the setting associated with the intensity slider 140 provided as a component of the design generator. That is, the intensity of the changes in the animation, for example, the speed at which the changes occur, the range over which changes occur, and the like, will depend on the setting associated with the intensity slider. In other embodiments, the intensity setting may vary without user intervention. For example, the intensity setting could vary randomly within a predetermined range or the full range of the intensity slider.

Referring to FIG. 1, the intensity slider 140 has a handle 142 positioned between Mild on the left and Wild on the right. Mild and Wild are just used as examples and other scales, including numerical scales, are included within the scope of embodiments of the present invention. As described below, the algorithm utilized to drive the animation uses the position of the handle in relation to the intensity slider to compute the rate, the range, or combinations thereof of the changes displayed by the animation. If the setting is near Wild, the design generator will cycle through variations on the width and colors of the shapes (e.g., lines) for the particular style with an increased intensity in comparison to a Mild setting.

In some embodiments, the range or extent of the variations presented by the animation will only be a function of the position of the intensity slider. In these embodiments, the rate of change of the animation is not modified when the slider is adjusted from Mild to Wild. For example, the speed at which lines will increase in width will be the same for values ranging from Mild to Wild in this particular embodiment. Thus, when the intensity slider is set at Wild, this setting may not cause the changes to happen more quickly, but will only make the changes more dramatic. Utilizing a rate-independent intensity slider, users are able to see the patterns in transition and pause the animation at a design that is pleasing to the user. In other embodiments, the rate of the changes can also be a function of the position of the intensity slider.

In contrast, if the setting is near Mild, the rate, range, or a combination thereof of variations will be more subdued, with the animation staying closer to the originally displayed design. As described in relation to FIGS. 5A and 5B, the setting of the intensity slider will contribute to the "distance" that the animation travels from the original design. Generally, the closer to Wild the handle is on the slider bar, the farther the animated design will travel, in shape and color, from the original design.

When the animation is stopped, typically based on user input, the 16 alternative tiles 132a, 132b, etc. positioned around the display tile 130 will be populated with variations on the design shown in the display tile. In embodiments with 16 or other numbers of alternative tiles, some or all of the alternative tiles will be populated upon pausing of the animation. In other embodiments, one or more of the alternative tiles may be populated during the animation. Thus, as the alternative tiles are populated, the designs in the alternative tiles will provide the user with variations based on the design in the display tile. For example, one alternative tile will have colors shifted towards green, another with colors shifted towards yellow, another with thinner lines, another with thicker lines on a portion of the design, another with a combination of thinner lines and a color shift. One of ordinary skill in the art would recognize many variations, modifications, and alternatives.

If the user clicks on one of the alternative tiles after they are populated, the design in the selected alternative tile will be swapped with the design in the display tile. In an embodiment, swapping of the designs in the alternative tile and the display tile will result in re-population of the alternative tiles based on variations on the selected alternative tile. After re-population, selection of a second alternative tile will cause the design in the second alternative tile to swap with the design from the first alternative tile present in the display tile. A second re-population will then occur, with the new alternative tiles being based on variations of the second alternative tile. Thus, under user control and based on random variations, numerous design options are provided to the user. As discussed throughout the present specification, the user may restart the animation as appropriate to the particular design process.

As described more fully in the concurrently filed application, once the user arrives at a final design, then the design can be utilized with the personalization system to personalize the electronic device.

As an example of the algorithm used to generate the designs described herein, the style of stripes is discussed below. The stripes pattern or style includes a number of stripes (e.g., vertical stripes) displayed across the display tile. The characteristics of the stripes (as well as other styles) are dimension (e.g., width) and color (e.g., RGB color). Generally, the number of objects such as stripes in the design is determined by the width of the object and the width of the screen that the objects fill. Each of the individual stripes in the pattern is defined by two values and two ranges: a random dimension (e.g., width) falling within a predetermined range and a random color, which is also within a predetermined color range. Thus, a stripe could be defined with a width of 5 units using a range of 0-7 units and an RGB color of R=50, G=200, B=100 using a color range defined by the intensity. For example, the range of the color could be 25<R<75, 175<G<21 225, and 75<B<125 of 0-255. In another embodiment, the color range will vary differently for each color. A second stripe would typically have a different dimension (e.g., width) between 0 and 7 units and a different RGB color defined within the 0-255 range. The design is built up by adding the objects (e.g., stripes) until the display tile is filled.

Figure 5A:
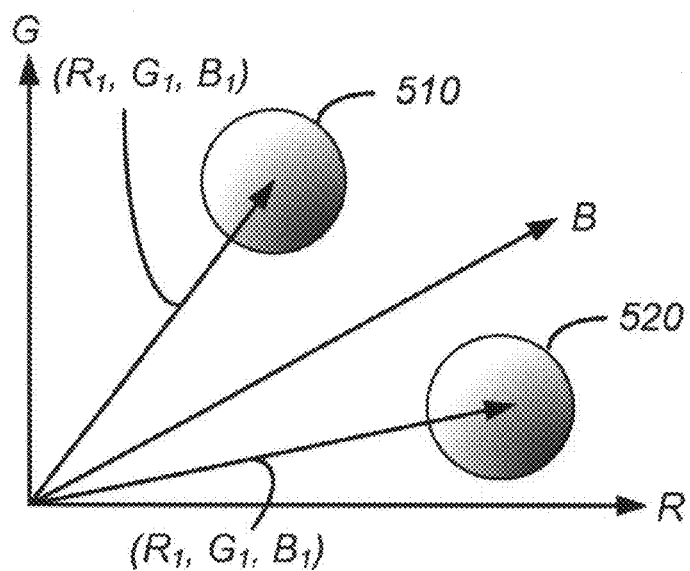
FIGS. 5A and B are simplified diagrams illustrating derivatives of primary and secondary colors for two settings of the intensity slider according to an embodiment of the present invention.

In building up the design in a particular embodiment, 75% of the colors are defined as derivatives of the primary color and 25% of the colors are defined as derivatives of the secondary color. FIGS. 5A and B are simplified diagrams illustrating derivatives of primary and secondary colors for two settings of the intensity slider according to an embodiment of the present invention. Referring to FIG. 5A, the primary color is an RGB color with coordinates illustrated by the point $(R_1, G_1, B_1)$. The value of the handle of the intensity slider for the embodiment illustrated in FIG. 5A is close to Mild, resulting in a relatively narrow range of potential colors. The range of potential colors that are derivatives of the primary color is thus defined by the volume of sphere 510 in one embodiment. In some embodiments, all three colors are varied over a range centered at the color components, providing colors that are derivatives forming a cube. However, for purposes of clarity, the sphere has been illustrated in FIGS. 5A and 5B with the color range expressed as a radial dimension centered at the RGB color. That is, the derivatives of the primary color, which will account for 75% of the colors used in forming the pattern, will have RGB coordinates falling within the sphere 510. FIG. 5A also illustrates the corresponding color sphere for the secondary color (i.e., $R_2, G_2, B_2$), with a sphere 520 also corresponding to the Mild setting. The derivatives of the secondary color, which will account for 25% of the colors used in forming the pattern, will have RGB coordinates falling within sphere 520.

Figure 5B:
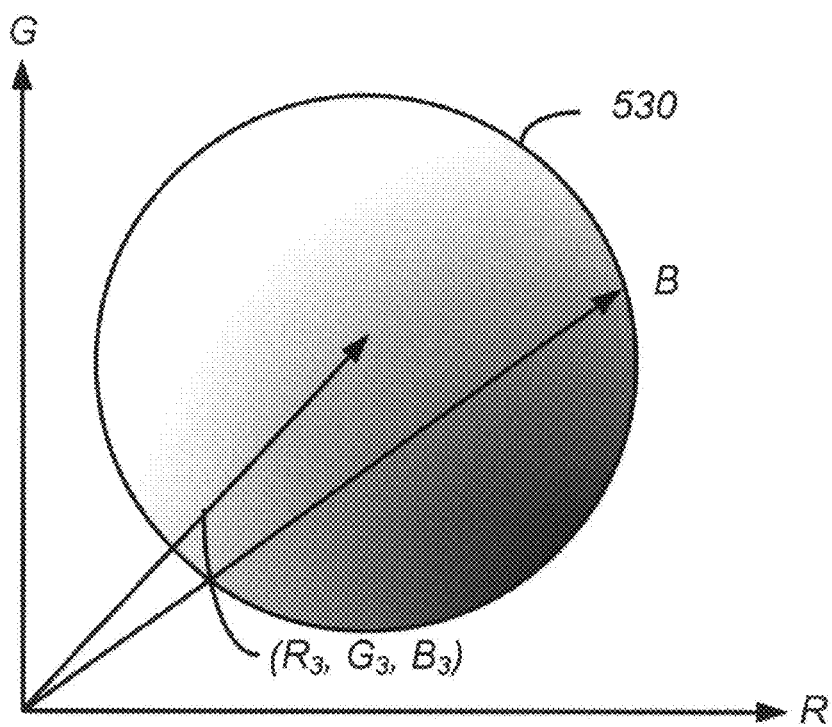

FIG. 5B illustrates derivatives of the primary color for a Wild setting of the intensity slider. For purposes of clarity, the secondary color $(R_4, G_4, B_4)$ is not illustrated in FIG. 5B. As shown in FIG. 5B, the sphere 530 centered at the primary color $R_3, G_3, B_3$ is much larger than those illustrated in FIG. 5A. Thus, the 75% of the colors that are derivatives of the primary color will cover a much wider color range than the derivatives of the primary color illustrated at the Mild setting. The same conditions will apply of the 25% of the colors that are derivatives of the secondary color. In fact, depending on the size of the sphere 530, it is possible in some embodiments to have colors within the sphere ranging over all possible colors (i.e., derivatives of $R_3, G_3, B_3$ or $R_4, G_4, B_4$ ranging from 0-255).

In other embodiments, other percentages of the colors are based on the primary and secondary colors and the 75%/25% example described herein is merely to serve as an example and not limit the scope of embodiments of the present invention. In other embodiments, the percentages are: 50/50, 40/60, 25/75, or the like. One of ordinary skill in the art would recognize many variations, modifications, and alternatives. In some embodiments, more than two colors could be selected, such as three colors with a 60/30/10 split, or a 33/33/33 split. Also, if the user sets the intensity slider near a Wild intensity, these percentages could be adjusted. For example, at a setting near Mild, the color percentages might be a 75/25 split between the primary and secondary colors, but at a setting near Wild, the color percentages could be 50/50. One of ordinary skill in the art would recognize many variations, modifications, and alternatives.

Similar ranges will be provided for the width of the patterns included for each style. For stripes, the width of each line will be a derivative of a base value, for example seven units, and the range of possible width values for the stripes will be determined based, in part, on the position of the handle on the intensity slider. For both colors and widths, since the color components can not go below zero and the line width cannot go below zero, the algorithm will provide a floor for both characteristics. As an example of the floor, a width of 2±3 would result in a range of 0-5. Thus, in a particular embodiment, the width of a line will be equal to the base value ± a factor associated with the intensity, for example width=7±3, giving a range of widths between 4 and 10.

As the animation progresses, for example, over 60 frames (i.e., 2 seconds of animation at 30 frames per second), the width of the lines in the stripes embodiment will fluctuate from the initial value of 7 to a value within the range from 4-10 units for the intensity setting provided above. If the handle on the intensity slider is set at a value closer to Wild, the intensity factor will be greater so that the width will vary over a larger range, for instance, width=7±7, varying from 0-14. Although this example defines the variation in width over 60 frames, other numbers of frames could be utilized in alternative embodiments. In addition to the variations in the line width, or characteristics of other objects, the color of the line will vary over the predetermined number of frames as illustrated with respect to FIGS. 4B and 4D. Thus, over time, the original pattern will be animated, with each of the objects such as a line changing in color and width in a random variation on the original design.

In addition to the variables or characteristics associated with each of the objects, embodiments of the present invention provide for global variables that are applied to the entire design. These global variables can include zoom, ripple, blur, or the like. The various global variables can operate singly, be combined or overlaid, or the like. Each of the global variables will be introduced with a random characteristic, for example, introducing some ripple for a first time period, then introducing some blur for a second time period, and zooming into a portion of the design and then zooming out. Combining the global variables will provide designs that are partially blurred as the ripple is introduced. The various global variables may have a period of oscillation that is randomized, effectively providing different periods for the oscillations, resulting in overlap of the global variables as well as separation as a function of time. Additionally, the various global variables can be added concurrently. One of ordinary skill in the art would recognize many variations, modifications, and alternatives.

Zoom as a global variable will result in a portion of the design (e.g., the upper right corner) being magnified as the image in the display tile zooms into the particular portion. Typically, the change in the global variable is independent of the changes that are occurring in the characteristics of the objects. As an example, for a pattern of stripes, the zoom global variable will increase or decrease the width of the lines as the image is zoomed in or out, resulting in an increase or decrease in the range of widths displayed, thereby increasing the variations provided by just the object changes. The magnitude of the changes resulting from the global variables will be dependent, in whole or in part, on the setting of the intensity slider. The changes resulting from the global variables are not object specific in some embodiments, but apply to all objects in a design.

In addition to global zoom, ripple is a global variable that will introduce a set of waves to the whole design, thereby rippling a set of lines, for example. The lines in this example, rather than being straight, will begin to become jagged or wavy. As with other global variables, the intensity of the waviness will depend, in whole or in part, on the intensity slider. Blur is a global variable that defocuses the design in the display tile, alternatively sharpening or blurring the design over a range of defocus values. In some embodiments, the global variables are not under user control, but function based on the value of the intensity slider. In other embodiments, the global variables are under user control and may have their own intensity sliders, oscillation period input, or the like that are under user control.

In an embodiment, each of the styles includes a pull-down menu that provides the user with alternative options related to each style. For example, for the stripes pattern, the pull-down menu could include options for vertical lines, horizontal lines, plaid, which is a combination of horizontal and vertical lines with predetermined transparency, and the like.

Circles are another pattern that can be used to create designs, with each of the circles being an object characterized by a width and a color. The circles are laid out in an embodiment based on the width, primary color, secondary color (e.g., 75%/25% breakdown discussed above), with these values varying around a base value depending on the intensity value of the intensity slider. The circles can be separate from each other or overlap. Additionally, other shapes including ovals, amoebas, paisley, and others are included within the scope of the present invention. The various objects making up the design can be positioned on the display tile by populating the display tile from a side, more than one side, the center, or other positions depending on the particular implementation.

After the animation has been initiated, the user is able to explore the design space by pausing the animation, which results in population of the alternative tiles based on the derivatives of the values associated with the design in the display tile, selecting one of the derivatives, restarting the animation to provide an animation cycle based on the selected alternative, pausing the animation again, which repopulates the alternative tiles with derivates based on the paused animation, and so on. In some embodiments, it is not necessary to select a derivative and the animation may be restarted by the user. Thus, the user is effectively provided with a tool that enables the user to choose the direction, with the actual results being randomly determined based on the intensity slider and the directions chosen by the user.

Considering the RGB vectors illustrated in FIGS. 5A and B, the user can pause the animation, and select an alternative tile with a color near the edge of the color sphere. When the animation is restarted, the new RGB vectors of the spheres will be re-centered on the properties of the selected alternative tile so that when the animation is paused again, the alternative tiles will populate based on the vector for the selected color. Thus, the user can steer or skew the RGB vector in the desired direction, while still utilizing the random nature of the algorithm to provide unique, personalized designs.

Figure 6A:
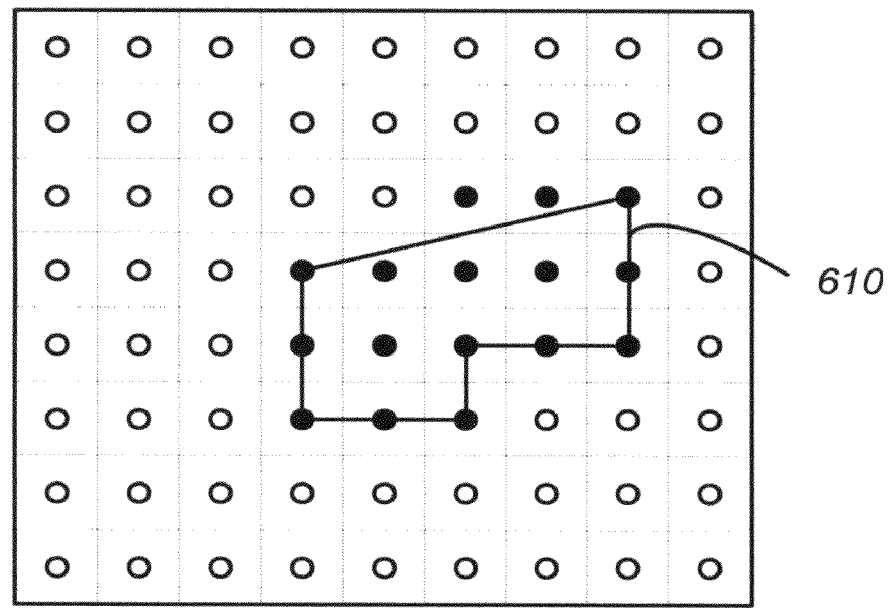
FIGS. 6A and 6B illustrate two designs based on the dots style according to an embodiment of the present invention.
Figure 6B:
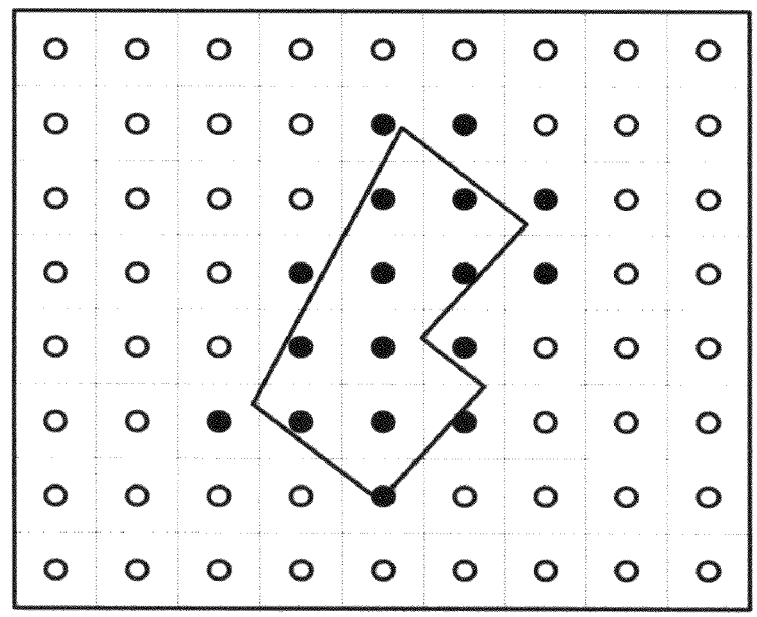

According to another embodiment, a style of dots is provided. FIGS. 6A and 6B illustrate two designs based on the dots style according to an embodiment of the present invention. As shown in FIG. 6A, dots are distributed across a grid spanning the display tile, with each of the dots being positioned at the center of each of the grid elements. Although dots are illustrated in each of the grid elements, this is not required by the present invention. Additionally, although circles are illustrated in FIG. 6A, this is not required by the present invention as other shapes including squares, triangles, polygons, ovals, animal figures, combinations thereof, and the like, can be utilized to form the design. In a particular embodiment, options for dots can include different shapes such as animals or the like. One of ordinary skill in the art would recognize many variations, modifications, and alternatives.

A random polygon 610 is overlaid on the grid as illustrated in FIG. 6A. Each of the objects are compared with the position of the polygon to determine if the object and the polygon overlap. If there is an overlap, then the overlapping objects are grouped together and given the same characteristics, such as color. The objects that do not overlap with the polygon are either assigned a different color from the overlapping objects or are assigned different colors depending on the particular implementation. Thus, as illustrated in FIG. 6A, all the overlapping circles are filled, representing a first color and non-overlapping circles are hollow, representing a second color.

A subsequent display tile of the animation of the design is illustrated in FIG. 6B, where the polygon 610 has rotated to a new position. Since the polygon has rotated, the group of objects overlapping with the polygon have changed. Accordingly, the group of overlapping objects, which are filled the same in this embodiment, shift in the display tile to match the position of the polygon, creating an effect similar to the movement of a school of fish. As the design animation proceeds, the group of overlapping objects will shift in position on the display, changing as a group. Additionally, the color and size of the objects, both in the overlapping group and the non-overlapping group can change as a function of time during the animation, thereby generating unique and interesting group shapes and patterns. In a particular embodiment, the color and the size of objects in the groups may vary within the group. As illustrated in FIGS. 6A and 6B, the dots themselves don't move during the animation, but the group moves over time. Depending on the color scheme and shapes of objects used, interesting textures and designs are generated that can then be used as described in the concurrently filed application to personalize the electronic device.

Moreover, although the polygon 610 illustrated in FIGS. 6A and 6B was only rotated in FIG. 6B, this is not required by the present invention. In some embodiments, the polygon changes in size and/or shape during the animation, in addition to rotating. Moreover, in other embodiments, the polygon may change size and/or shape, but not rotate. Combinations of these changes in the polygon may be provided depending on the particular implementation. Moreover, although the polygon was illustrated with straight edges, other shapes are included within the scope of embodiments of the present invention.

According to yet another embodiment of the present invention, another pattern is provided as part of the design generator. This additional pattern is based on one of several geometrical shape, for example, circles, squares, triangles, polygons, or the like. When the user selects a particular shape, that shape will be randomly distributed across the display tile, with each of the objects having a unique color, size, location, orientation angle, and the like. Each of the objects will be semi-transparent and can also have one or more of the global variables applied to the individual shape, for example, blur or ripple. As the animation proceeds, the objects will change their characteristics based on the local as well as the global variables, providing a unique design. Pausing of the animation will result in population of the alternative tiles as described above. In a particular embodiment, the transparency of any object in any style may be varied and morphed based on the position of the intensity slider. One of ordinary skill in the art would recognize many variations, modifications, and alternatives.

Embodiments of the present invention provide an environment in which a user, with very little effort, can in a controlled environment, create a unique and personalized design. The guided and/or assisted process provides a level of personalization not available with conventional tools as the user is able to design an image with which the user can personally identify. Rather that selecting an image from a library, the user is able to create unique designs using a method somewhat independent of the user's artistic abilities.

Embodiments of the present invention are not only applicable to creation of personalized images for electronic devices, but are also applicable to many other uses. For example, the design generator described herein could provide personalized designs suitable for other personalization processes, such as personalizing your Facebook background.

Figure 2:
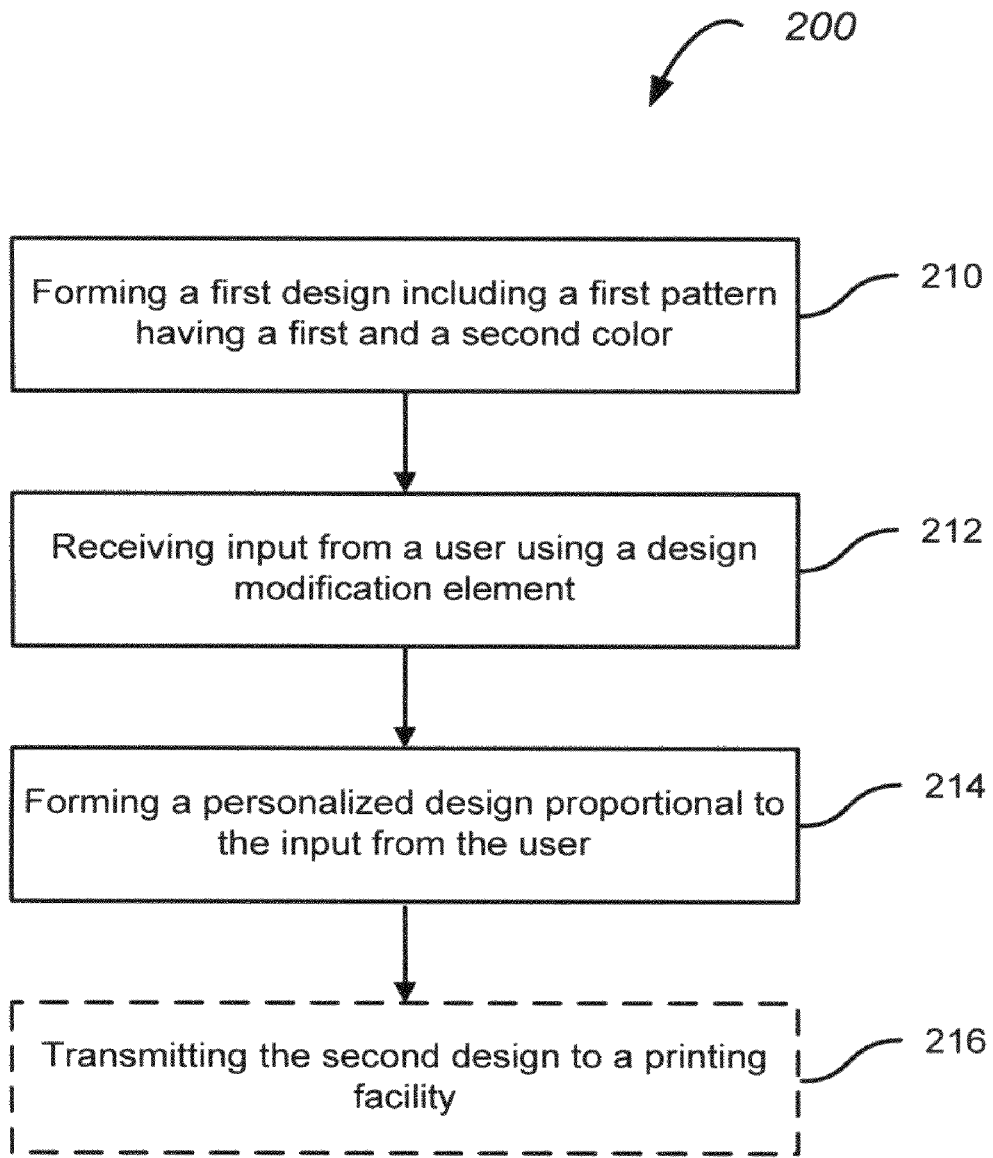
FIG. 2 is a simplified flowchart illustrating a method of generating a design according to an embodiment of the present invention.

FIG. 2 is a simplified flowchart illustrating a method 200 of generating a personalized design according to an embodiment of the present invention. The method includes forming a first design including a first pattern having a first color and a second color (210). As an example, the first pattern can be based on any of the styles described herein or combinations thereof. The first color and the second color, which are based on the primary color palette and the secondary color palette, respectively, are either selected by the user or set as default values. An input is received from the user using a design modification element. In some embodiments, the design modification element is the intensity slider described more fully throughout the present specification. In other embodiments, other forms of an intensity slider are provided, for example, a circular scale with a slider that rotates from a low level input to a high level input similar to a volume control knob. The design modification element, which may provide a digital input with discrete steps between levels, or a more analog input with smaller increments between levels, includes various devices that enable the user to indicate the intensity with which the patterns and colors are to be modified during design changes such as animation. Although a single intensity slider is illustrated in FIG. 1, this is not required by embodiments of the present invention since multiple intensity sliders give the user an additional level of input. For example, there could be a first intensity slider for changes in color and a separate intensity slider for changes in animation range. One of ordinary skill in the art would recognize many variations, modifications, and alternatives.

A personalized design is then formed in which the personalized design is proportional to the input received from the user using the design modification element. The personalized design, which can also be referred to as a customized image, includes a second pattern. Typically, the second pattern will be a variation on the first pattern, with the shapes of the objects in the pattern changed in comparison to the first pattern as well as the colors (a third color and a fourth color) used to form the pattern. The third color is typically a variation on the first color and the fourth color is typically a variation on the second color. Alternatively, the third color may be the first color and/or the fourth color may be the second color in a particular embodiment. The variations in the pattern and the color are based on the user input associated with the design modification element. For example, as discussed in relation to FIGS. 5A and 5B, the changed colors utilized in the pattern are varied within the sphere of colors centered on the original color. Similar variations for shapes of the objects in the pattern are also provided.

In alternative embodiments, the personalized pattern may be based on additional user inputs provided in addition to those related to the design modification element. As an example, the user may modify one or more of the colors using the color palettes and then allow the animation to develop new images based on the modified colors. Additionally, multiple inputs using the design modification element may be received, with the animations undergoing a series of different cycles based on different intensity values. The animation may be paused, restarted, alternative tiles may be selected to swap their position with the display tile, and the like as described above.

It should be appreciated that the specific steps illustrated in FIG. 2 provide a particular method of generating a personalized design according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3:
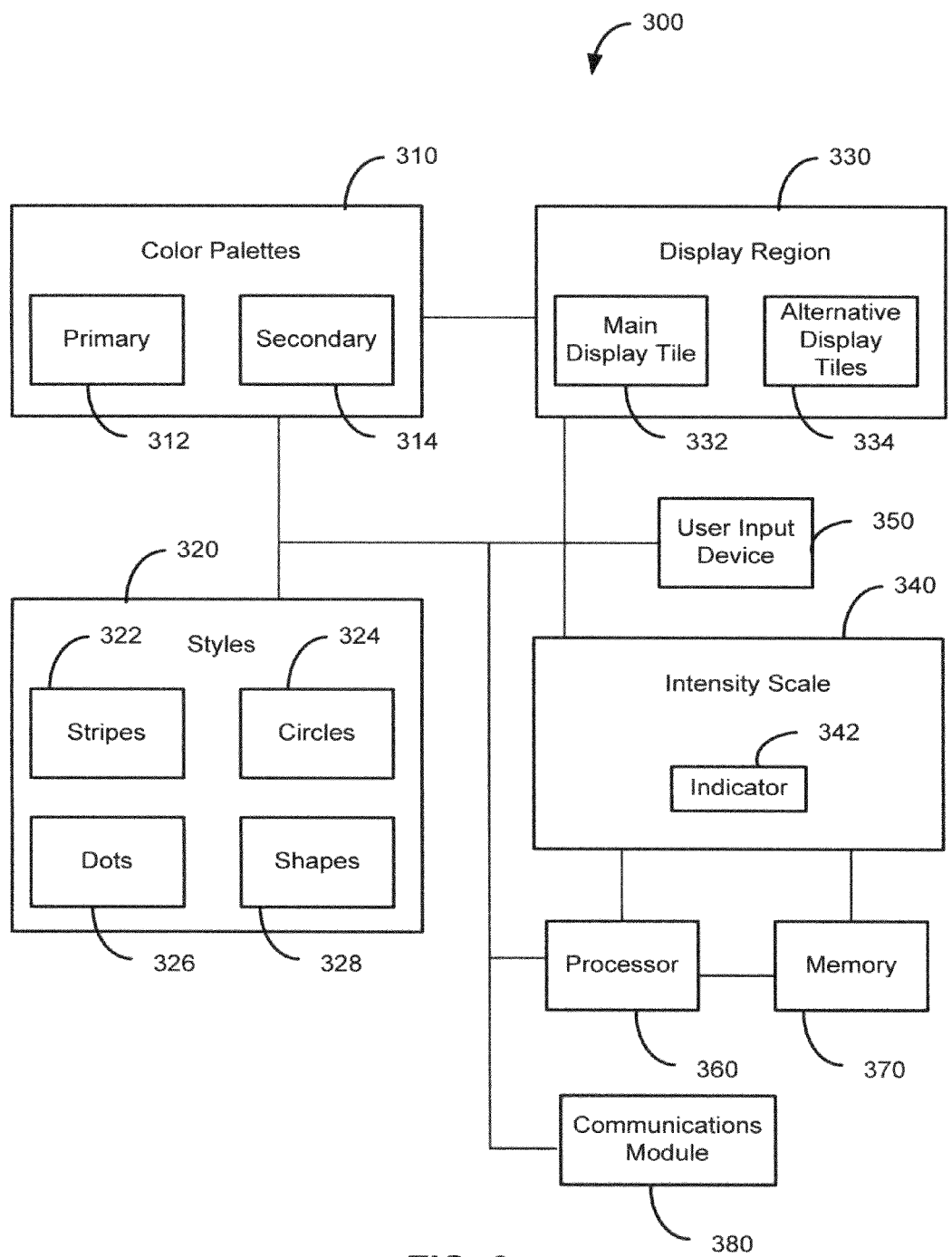
FIG. 3 is a simplified schematic block diagram of a design generator according to an embodiment of the present invention.

FIG. 3 is a simplified schematic block diagram of a design generator 300 according to an embodiment of the present invention. As illustrated in FIG. 3, the design generator 300 includes a set of color palettes 310, a set of styles 320, a display region 330, and an intensity scale 340. The color palettes in the embodiment illustrated in FIG. 3 include a primary color palette 312 and a secondary color palette 314. In other embodiments, a single color palette is used, with the secondary color being determined based on the primary color, which is selected using the single color palette. The styles 320 include a number of different styles as appropriate to the particular application. As an example, the styles may include stripes 322, circles 324, dots, 326, and shapes 328. Other styles are included in other embodiments, and these styles are listed herein merely by way of example.

The display region 330 includes a first portion in which the main display tile 332, referred to herein as a display tile, is displayed. The display region also includes a second portion in which the alternative display tiles 334 are displayed. Generally, the main display tile 322 is larger than the alternative display tiles 334, for example, a large central main display tile surrounded by smaller alternative display tiles. Although FIG. 1 includes a display region featuring a large main display tile surrounded by alternative tiles, this is not required by embodiments of the present invention and other designs are included within the scope of the present invention. An intensity scale 340 is also included as part of the system, with an indicator 342 used to show the intensity value associated with the intensity scale. Although a linear intensity scale is illustrated in some embodiments, other scales including rotary scales are included within the scope of the present invention.

A user input device 350 is provided in communication with the color palettes 310, the styles 320, the display region 330, and the intensity scale 340. Thus, a user is able to interact with the design generator, selecting or modifying the colors and styles. As discussed more fully throughout the present specification, the styles can have options that are applied to each style individually. Additionally, global options (not illustrated) are provided which enable the user to have further control over the patterns displayed in the display region. A processor 360 and memory 370 are provided as part of the system, enabling animation of the designs created using the design generator and storage of both intermediate and final designs. A communications module 380 is provided as well so that designs can be transmitted to computers, printers, and the like after their creation.

Figure 4A:
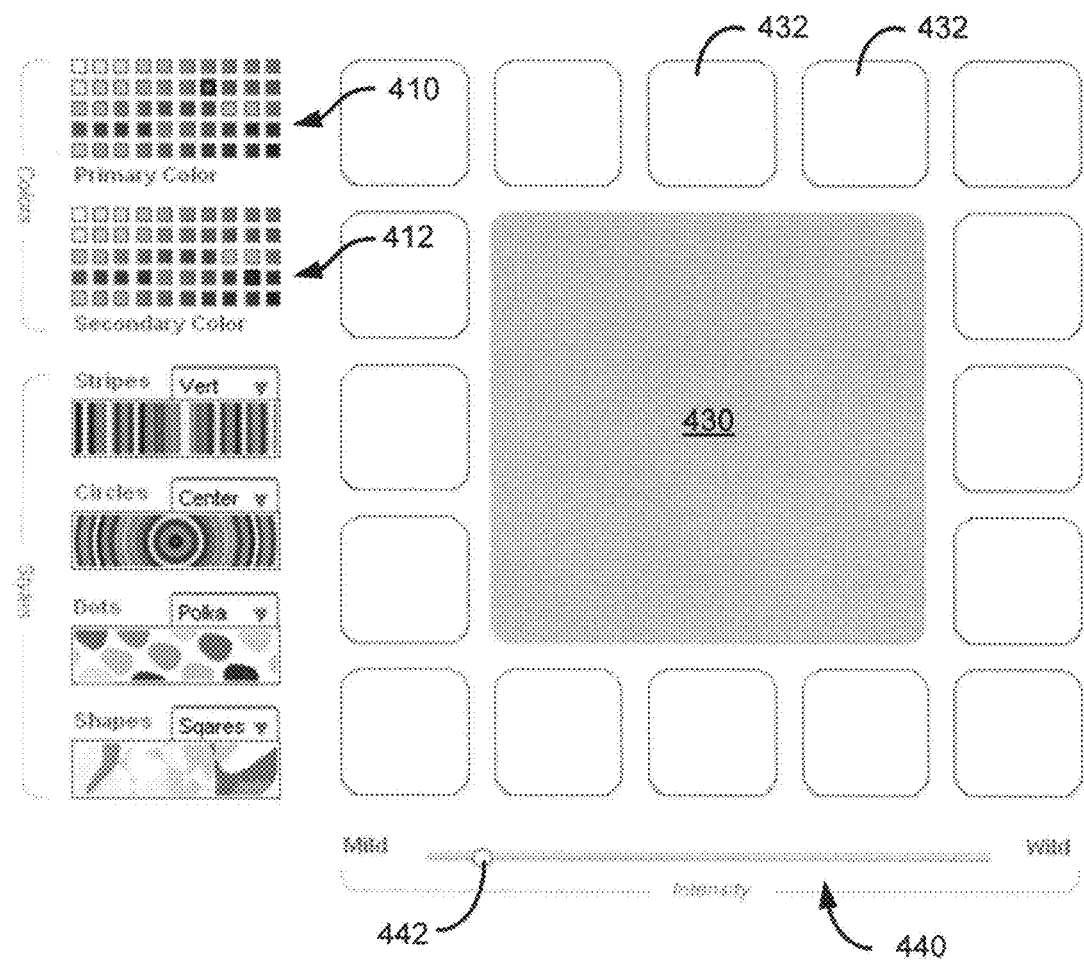
FIGS. 4A-4E are simplified diagrams illustrating the design generator at several times according to an embodiment of the present invention.

FIGS. 4A-4E are simplified diagrams illustrating the design generator at several times according to an embodiment of the present invention. Referring to FIG. 4A, the design generator is illustrated at an initial phase when the design generator has just been invoked. The primary color palette 410 and the secondary color palette 412 are illustrated as well as the available styles (e.g., stripes, circles, dots, shapes, and the like). As illustrated in FIG. 4A, no default colors or patterns are set in this embodiment, but the initial colors and style are selected by the user after start-up. In another embodiment, the colors associated with the primary and secondary colors and/or the dimensions associated with the styles are defined based on default values. For example, the primary color and the secondary color can be based on a default color of the color palettes or can be selected by the user as illustrated in FIG. 4A. Additionally, the dimensions may be defined randomly or by a value entered by the user. In a particular embodiment, the secondary color is based on a variation of the primary color, which could be selected by a user when the application is initiated. Alternatively, the colors can be set at random values. One of ordinary skill in the art would recognize many variations, modifications, and alternatives.

The styles have pull down menus displayed, with one of the options available through the pull down menus shown. For stripes, the option of vertical stripes is displayed, for circles, the option of centering of circles is displayed, and the like. The user, when selecting one of the styles, can modify the initial style using the pull down menu associated with the particular style selected. Initially, as shown in FIG. 4A, the display tile 430 is grayed out and the alternative tiles 432 are empty or blank. The intensity slider 440 is set at a value or position 442 near the Mild end of the scale, but this is not required by the present invention. The value of the intensity slider could be set at other positions, either by the user or by default.

Figure 4B:
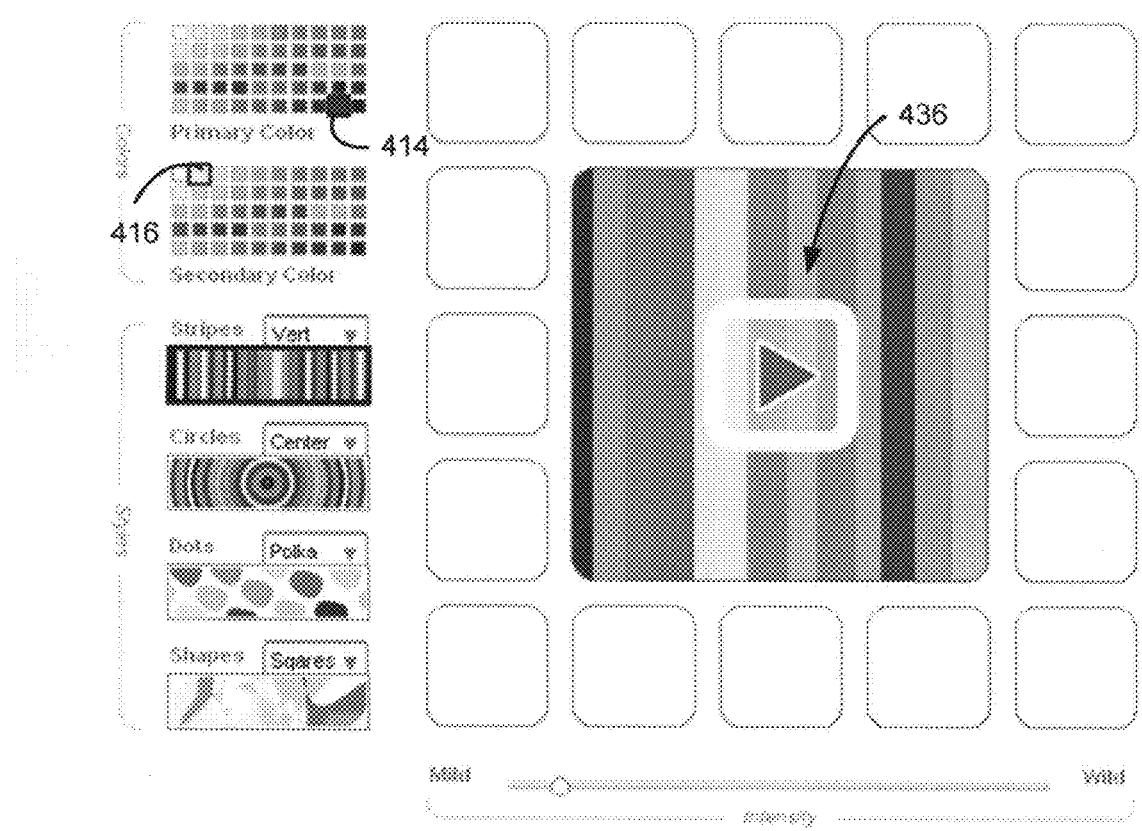

FIG. 4B illustrates the design generator after the primary color 414, the secondary color 416, and the style (stripes) have been selected by the user. In this embodiment, the primary color 414 has been set at a shade of blue and the secondary color 416 has been set at a shade of yellow. The stripes style has been selected in the vertical configuration as illustrated by the pull-down menu indicator. For each style or pattern, a series of alternative designs are available through the pull-down menus illustrated by the Options tab. The options will be displayed visually as thumbnail that will be pre-generated. When an option is selected from the drop down the pattern thumbnail in the style boxes will update to the selected option.

Accordingly, at the relatively Mild intensity illustrated, the colors in the first pattern displayed in the display tile are based on the primary and secondary color, randomly distributed around these colors based on the value of the intensity slider. A Play button 436 (sometimes referred to as a Play/pause button) appears in the display tile, typically centered on the display tile. Prior to animation, the alternative tiles continue to be empty or blank in the embodiment illustrated by FIG. 4B.

Figure 4C:
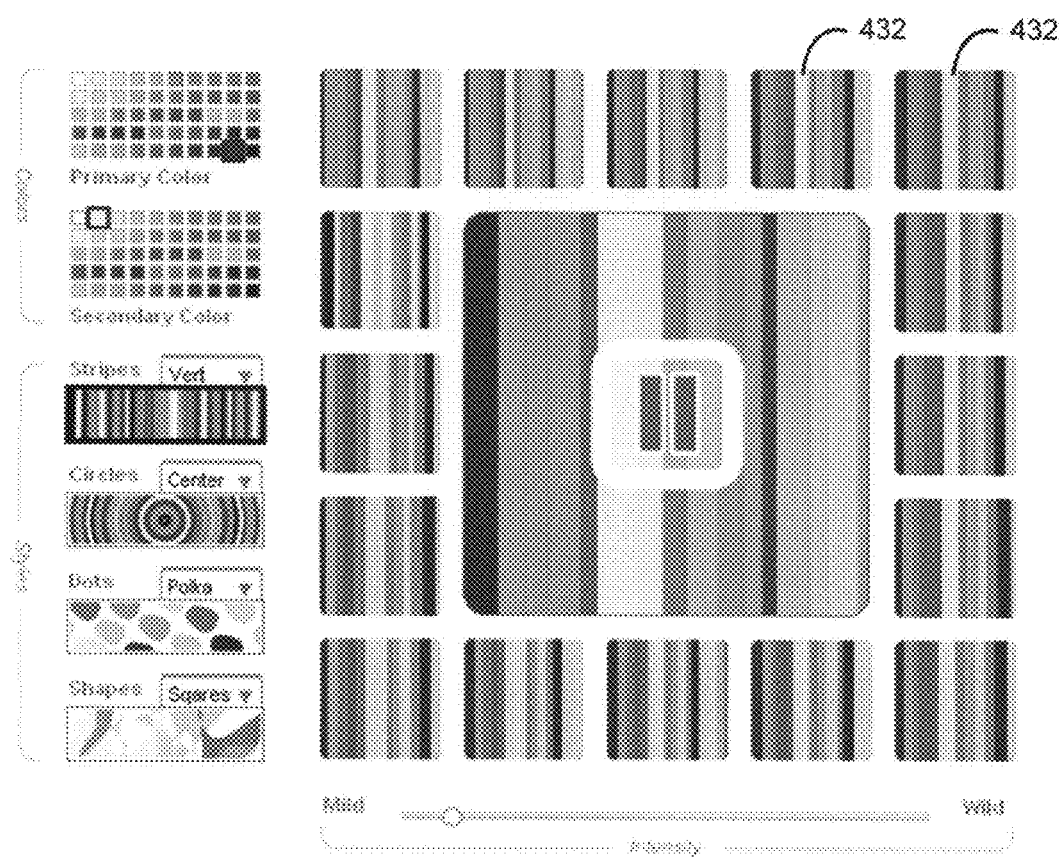

FIG. 4C illustrates the design generator after a first period of animation. The pattern in the display tile is a vertical stripes pattern, but the colors of the pattern as well as the widths of the stripes has changed during the animation period. In the example illustrated in FIG. 4C, the average stripe width has decreased, resulting in the number of stripes after animation being greater than the number of stripes at the beginning of the animation. Additionally, the colors of the stripes have changed randomly based on the value of the intensity slider. In an embodiment, during the animation, a Pause button is displayed in the display tile, providing the user with an opportunity to pause the animation at a desired pattern. In another embodiment, a Play or Pause button is only shown over the display tile when a user moves the mouse over the display tile. In this embodiments, when a user moves the mouse off of the display tile, there is no overlay, providing an unobstructed view of the complete display tile. In yet another embodiments, the Play/Pause button is positioned outside of the display tile boundaries so that a user can see the button and the display tile concurrently. In this alternative embodiment, the mouse does not have to be positioned over the image to start or stop the animation. When the Pause button is selected, the alternative tiles will be populated as illustrated in FIG. 4C. As illustrated, the alternative tiles 432 have patterns that vary from the pattern shown in the display tile, with variations in color and style parameters. Thus, 17 different and unique patterns are displayed by the design generator.

At one or more times during the use of the design generator, the setting of the intensity slider of the design generator can be adjusted. In some embodiments, the intensity slider is referred to as a design modification element. As illustrated in FIG. 4C, the intensity slider includes a handle or other position indicator 442 that is adjustable by the user and indicates the intensity value associated with the intensity slider 440. The intensity value of the intensity slider is used in the algorithm that controls how far the animation will adapts from the originally selected parameters. For example, if blue is selected as the primary color (i.e., R=0, G=0, B=255) and the handle of the intensity slider is positioned near Mild, the RGB values of the primary color will only be modified slightly, basically providing shades of blue. As the handle of the intensity slider is shifted towards Wild, the variation of the primary and secondary colors as well as the widths of the objects will increase.

In FIG. 4C, the handle of the intensity slider is positioned at the initial position illustrated in FIG. 4A, however this is not required by the present invention. In other exemplary processes, the handle of the intensity slider is moved along the scale. In one embodiment, changing the position of the handle toward Wild while the animation is in progress will automatically update the algorithm and the animation will change more dramatically than before the handle was moved. In another embodiment, if the handle is moved while the animation is paused, the alternative designs will be regenerated and displayed using variations based on the new intensity value. In yet another embodiment, clicking on the handle of the intensity slider without moving it while the animation is paused will regenerate all of the alternative designs displayed in the alternative tiles with different designs.

In a specific embodiment, if a user selects a new style or pattern, the animation will be restarted from the patterns default settings. For example, a simple transition can fade to the new pattern that has been selected by the user.

Figure 4D:
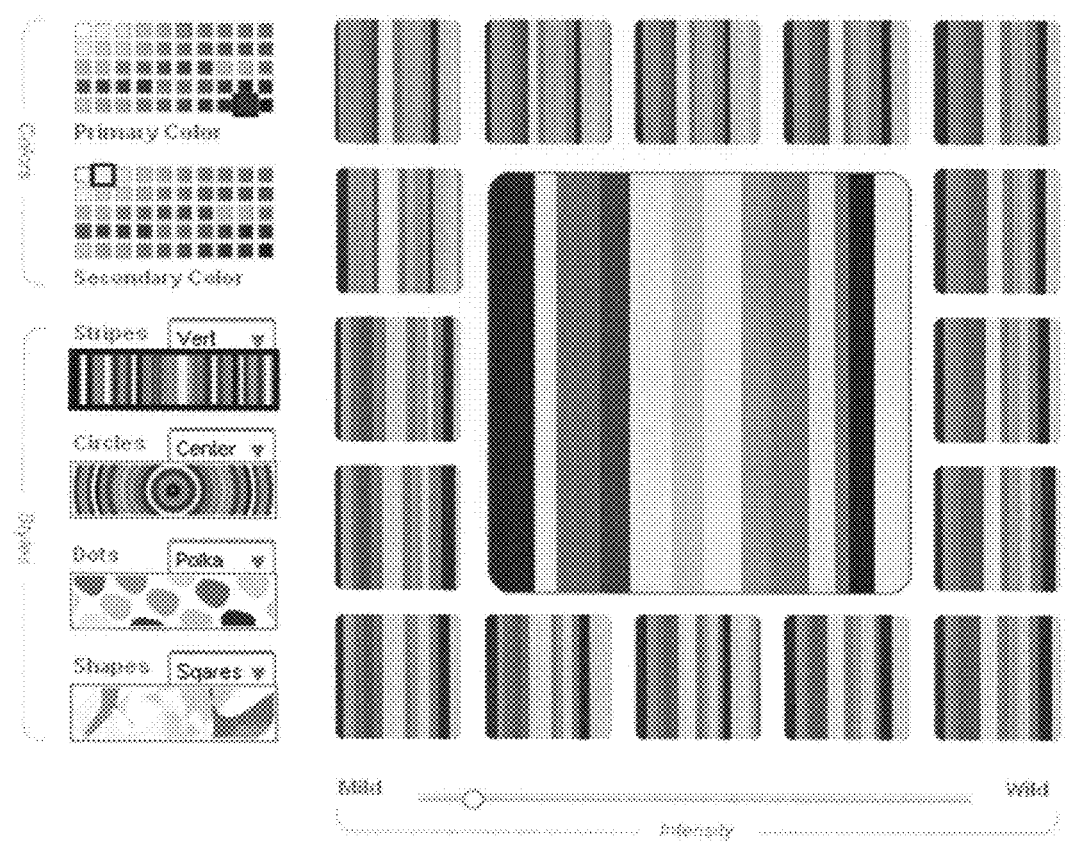

FIG. 4D illustrates the design generator after a second period of animation. The pattern illustrated in the display tile has changed as a result of the animation. Generally, each time the animation is paused or stopped, the alternative tiles surrounding the display tile will repopulate with alternate images (except for locked tiles).

Figure 4E:
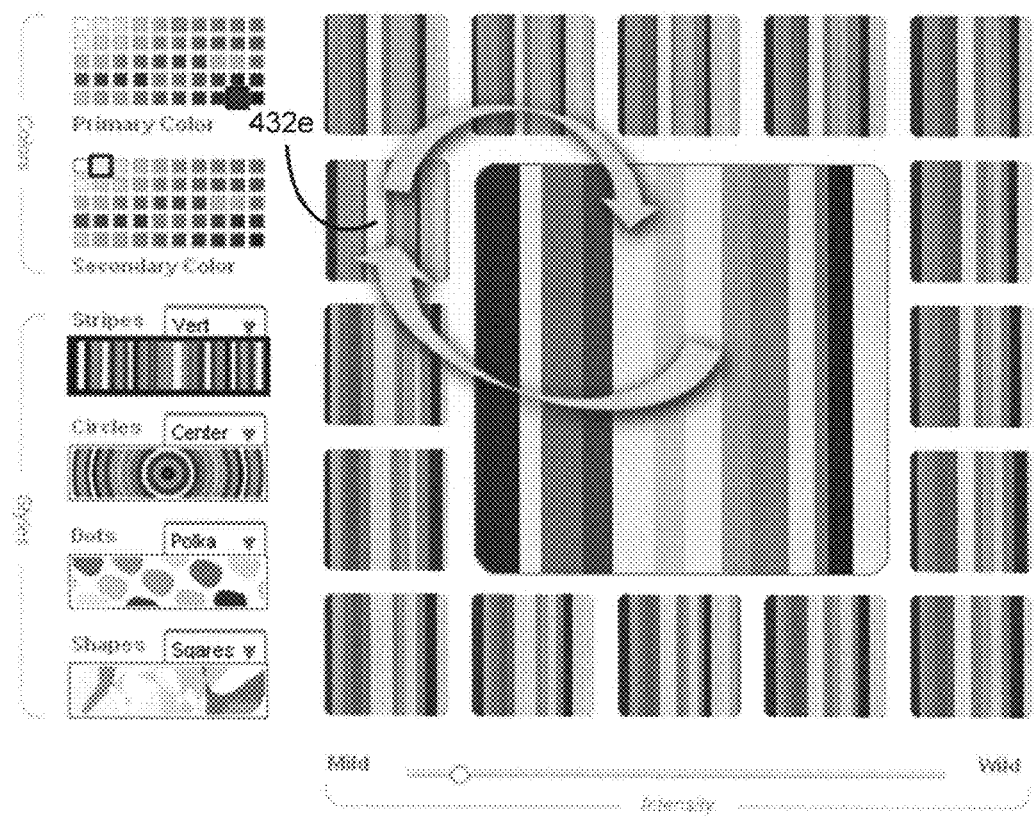

FIG. 4E illustrates selection of an alternative tile after the second period of animation. The user has the ability to select any one of the 16 alternative tiles that are disposed around the periphery of the display tile. As discussed above, the designs in the alternative tiles are designs that are modifications or variations of the design shown in the display tile. The variations are based on the position of the Mild/Wild intensity slider that is displayed at the bottom of the design generator. By selecting the alternative tile 432e, the user is able to switch the positions of the pattern in the alternative tile and the pattern in the display tile as illustrated by the arrows shown in FIG. 4E.

According to an embodiment, when the user slides the mouse or other user input device over one of the alternative tiles, the alternative tile will increase in size (e.g., double in size) to provide the user with a larger preview of the design in the particular alternative tile. Preferably this rollover effect will be accomplished with a smooth pop in/out transition.

In order to explore new designs based on the alternative tile, embodiments of the present invention provide the user with the ability to select an alternative design and exchange the design in the display tile with the selected alternative design as shown in FIG. 4E. Generally, clicking on the alternative tile will cause the alternative design to swap places with the design in the display tile. In a particular embodiment, during this exchange, the user will see an animation of the design in the display tile zooming into the position of the alternative tile while the design in the alternative tile zooms into the display tile. Preferably, this animation will involve the tiles swinging around each other.

Additionally, in some embodiments, users have the ability to lock a thumbnail displayed in a alternative tile. When the user rolls a mouse or other user input device over a particular alternative tile, a small gray lock will be displayed in the top corner of the thumbnail displayed in the alternative tile. When the lock is clicked, the thumbnail will become locked and may be offset from the rest of the alternative tiles. Referring to FIG. 1, the top middle alternative tile 132c is locked and shows the lock icon. Additionally, this locked alternative tile 132c is also slightly magnified and tilted counter-clockwise with respect to the other alternative tiles, further demonstrating the locking of the tile to the user. In FIG. 1, the alternative tile 132d below the top right tile is also locked. When a particular thumbnail is locked, it will not be regenerated when the animation is paused. In an embodiment, when a locked thumbnail is selected by the user, it will replace the design in the display tile and will not be swapped with the design in the display tile. Multiple alternative tiles can be locked concurrently. One of ordinary skill in the art would recognize many variations, modifications, and alternatives.

After selection of the alternative tile, the user is able to restart the animation, thereby creating unique and interesting designs. The process of operating the design generator is not limited to that described in relation to FIGS. 4A-4E, but can be varied, by combining different sequences of selecting colors and style, modifying the colors and/or style, modifying the options for a style, adjusting the intensity slider, selecting alternative tiles, running the animation, pausing the animation, locking alternative tiles, and the like. One of ordinary skill in the art would recognize many variations, modifications, and alternatives.

Figure 7:
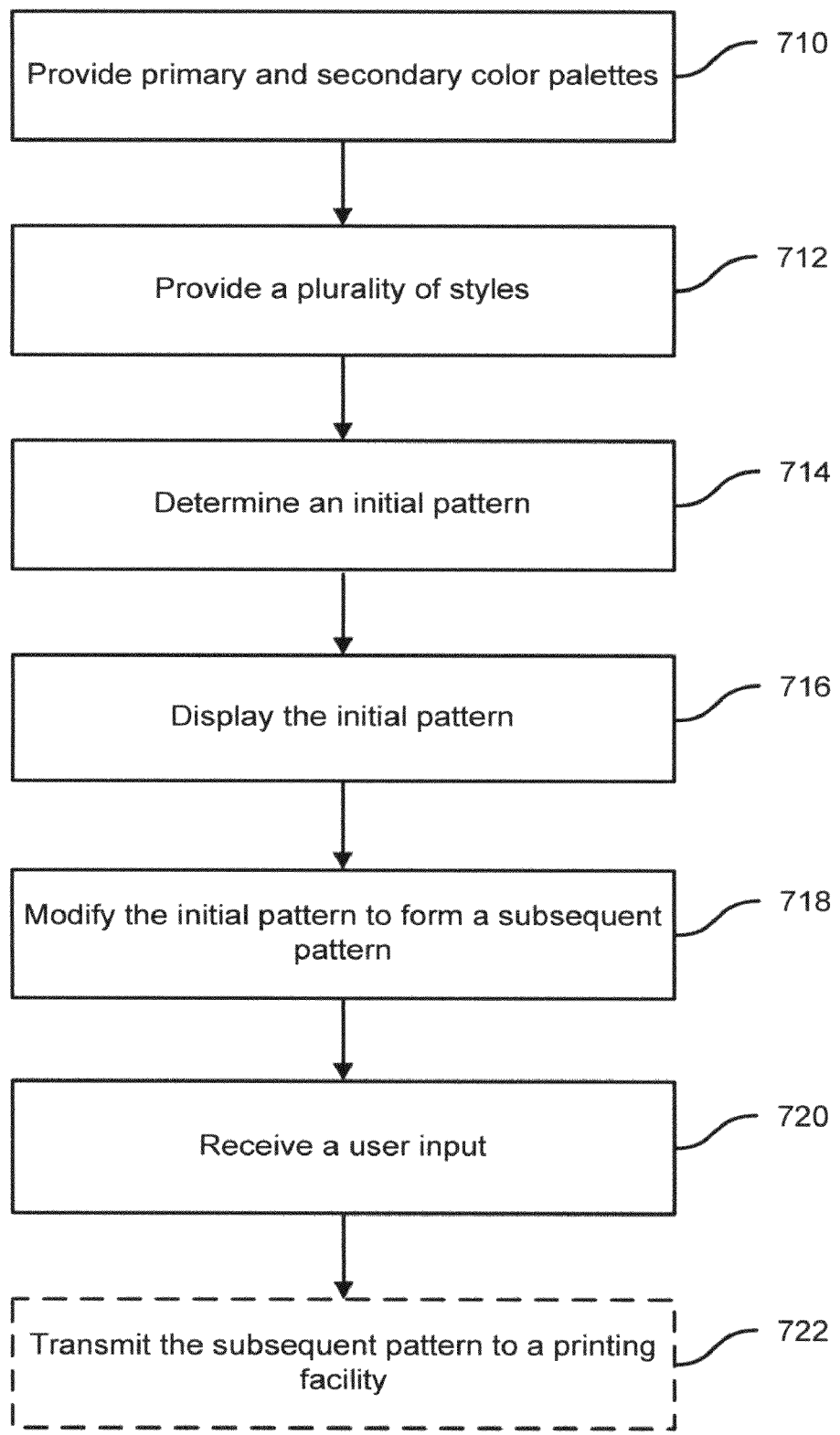
FIG. 7 is a simplified flowchart illustrating a method of generating a personalized design according to an embodiment of the present invention.

FIG. 7 is a simplified flowchart illustrating a method 700 of generating a design according to an embodiment of the present invention. As shown in FIG. 7, a primary and a secondary color palette are provided (710). The primary and secondary colors may be selected by a user or set by default. The method also includes providing a plurality of styles (712). As with the colors, the style can be selected by a user or set by default to a particular style. In some embodiments, setting the colors and style by default will provide for loading of the parameters when design generator is first loaded, which can enable the animation to begin working as soon as the application is opened and launched. As discussed above, the styles can be stripes (e.g., horizontal, vertical, plaid), circles (e.g., center, corner, plaid), dots (e.g., polka, retro, symbols, random), shapes (e.g., squares, triangles, circles, polygons, random shapes), or other suitable styles. For these styles, the display tile can be populated with objects from a side, from the center, from a corner, or combinations thereof.

An initial pattern is determined (714) and displayed (716) in the display tile. Determination of the initial pattern will be based on the position of the handle for the intensity slider, which will be either set at a default value or selected by the user. In an embodiment, the design in the display tile begins animating automatically. In another embodiment, the design in the display tile will be animated in response to the user selecting a Play/Pause toggle button that is displayed in the center of the display tile (similar to playing of internet videos). Thus, the initial pattern will be modified to form a subsequent pattern (718). Pausing the animation will result in population of the alternative tiles, typically using an animated effect in which each alternative tile is populated one after another in a circular motion around the display tile.

As described above, selection of an alternative tile will result in the design in the alternative tile and the design in the display tile switching places. When Play is selected by the user, the animation will continue from the design that is currently in the display tile, even if the original design that had been paused is located in one of the alternative tiles. In an embodiment, when an animation is restarted, the alternative tiles will maintain their design and will not be grayed out as they were when the animation was first started. In this embodiment, the user is allowed to click an alternative tile while the animation is playing. When this is done, the animation will be reset to the selected alternative tile and the animation will begin adapting from that design. Typically, the animation that was in the display tile at the time the user selects the alternative tile will be lost and not swapped. It should be noted that in some embodiments, a user can backup or reverse the animation in order to return to a previous design. Thus, a user can go back to a particular design that was interesting or visually pleasing, but was not initially selected at a time during a previous animation.

When the design in the display tile is satisfactory, a user input is received (720). This can be at one of several times during the animation process, for example, after the animation has been paused, alternative tiles have been selected, and a new animation has begun. The user input that pauses the animation is associated with the subsequent pattern, which is displayed in the display tile after the animation is paused. The subsequent pattern or designs based on and/or associated with the subsequent pattern is transmitted to a printing facility (722) for subsequent printing onto an electronic device. The printing facility can be co-located with the place of manufacture, separate from the place of manufacture, or combinations thereof.

It should be appreciated that the specific steps illustrated in FIG. 7 provide a particular method of generating a design according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A non-transitory computer-readable medium including instructions that, when executed by a processor, cause the processor to generate a graphical user interface for generating a customized image for personalizing an electronic device, the graphical user interface comprising:
- a primary color palette including a first plurality of colors, wherein a first color is defined as a primary color;
- a secondary color palette including a second plurality of colors, wherein a second color is defined as a secondary color, the secondary color being different from the primary color;
- a plurality of styles, wherein a style of the plurality of styles is defined as an initial style having a dimension;
- an intensity scale ranging from a minimum intensity value to a maximum intensity value, wherein an indicator is positioned in association with an initial intensity value; and
- a first display tile that is configured to display a plurality of graphic designs in an animation and, in response to user input, cause a first graphic design that is currently being displayed in the animation to be displayed in a second display tile associated with the first display tile,
- wherein each of the graphic designs is a derivative of an initial graphic design that is based on the primary color, the secondary color, and the initial style, and
- wherein a difference between each of the graphic designs and the initial graphic design is related to the initial intensity value, and
- wherein each of the graphic designs is characterized by a color set varied from the primary color and the secondary color based on the initial intensity value and a style having a modified dimension in comparison with the initial style, and
- wherein a rate of displaying different graphic designs within the first display tile is related to the initial intensity value.

2. The computer-readable medium of claim 1 wherein the secondary color is based on the primary color.

3. The computer-readable medium of claim 1 wherein the second plurality of colors is the same as the first plurality of colors.

4. The computer-readable medium of claim 1 wherein the plurality of styles comprise at least one of stripes, swirls, circles, dots, or waves.

5. The computer-readable medium of claim 4 wherein the initial graphic design is characterized by a first color that is a derivative of the primary color, a second color that is a derivative of the secondary color, and a first dimension.

6. The computer-readable medium of claim 5 wherein the derivative of the primary color and the derivative of the secondary color are functions of the initial intensity value.

7. The computer-readable medium of claim 1 further comprising a plurality of alternative tiles adjacent the display tile, wherein the second display tile is included in the plurality of alternative tiles.

8. The computer-readable medium of claim 7 wherein each of the alternative tiles is configured to display a modified graphic design, wherein each modified graphic design is a derivative of one of the graphic designs in the plurality of graphic designs.

9. The computer-readable medium of claim 1 further comprising receiving a user input to set an updated intensity value of the intensity scale.

10. The computer-readable medium of claim 9 further comprising modifying the graphic designs in the plurality of graphic designs based on the updated intensity value.

11. A system configured to generate a customized image for personalization of an electronic device, the system comprising:
- a processor; and
- a memory that includes a graphical user interface comprising:
  - a design modification element that defines a primary color, a secondary color, an initial style having a dimension, and an initial intensity value,
  - a first display tile that is configured to display a plurality of graphic designs in an animation and, in response to user input, cause a first graphic design that is currently being displayed in the animation to be displayed in a second display tile associated with the first display tile, and
  - a user input module configured to receive a user input related to the design modification element,
  - wherein each of the graphic designs is a derivative of an initial graphic design that is based on the primary color, the secondary color, and the initial style, and
  - wherein a difference between each of the graphic designs and the initial graphic design is related to the initial intensity value, and
  - wherein each of the graphic designs is characterized by a color set varied from the primary color and the secondary color based on the initial intensity value and a style having a modified dimension in comparison with the initial style, and
  - wherein a rate of displaying different graphic designs within the first display tile is related to the initial intensity value.

12. The system of claim 11 wherein a subsequent graphic design of the plurality of graphic designs is characterized by a modified style that is a derivative of the initial style.

13. The system of claim 12 wherein the modified style comprises a change in a width of a portion of the initial style.

14. The system of claim 11 wherein a first color of the initial graphic design is determined based on a primary color defined by the design modification element.

15. The system of claim 11 wherein a second color of the initial graphic design is determined based on the primary color defined by the design modification element.

16. The system of claim 11 wherein a second color of the initial graphic design is determined based on a secondary color defined by the design modification element.

17. The system of claim 16 wherein the secondary color is based on the primary color defined by the design modification element.

18. The system of claim 11 wherein the design modification element includes:
- a set of color palettes including a primary color palette and a secondary color palette; and a set of styles.

19. The system of claim 11 further comprising a plurality of alternative tiles configured to display a modified graphic design, wherein each modified graphic design is a derivative of one of the graphic designs and wherein the second display tile is included in the plurality of alternative tiles.

20. The system of claim 11 further comprising an export module configured to transmit an image that represents a selected graphic design of the plurality of graphic designs to a printing facility.

21. The system of claim 20 further comprising a printer configured to receive the electronic device and permanently affix the image to the electronic device.

* * * * *